United States Patent
Wu et al.

(10) Patent No.: US 9,891,636 B2
(45) Date of Patent: Feb. 13, 2018

(54) CONTROLLING DEVICE AND METHOD FOR HVAC SYSTEM

(71) Applicant: INDUSTRIAL TECHNOLOGY RESEARCH INSTITUTE, Hsinchu (TW)

(72) Inventors: Min-Der Wu, Hsinchu (TW); Yau-Bin Yang, Hsinchu (TW); Yang-Guang Liu, Hsinchu (TW); Meng-Yen Tsai, Hsinchu (TW); Min-Ju Lin, Hsinchu (TW); Wei-Da Tu, Hsinchu (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 510 days.

(21) Appl. No.: 14/306,494

(22) Filed: Jun. 17, 2014

(65) Prior Publication Data

US 2015/0168964 A1  Jun. 18, 2015

(30) Foreign Application Priority Data

Dec. 12, 2013 (TW) .............................. 102145813 A (51) Int. Cl.
*G05D 23/00* (2006.01)
*G05D 23/19* (2006.01)
*F24F 11/00* (2006.01)

(52) U.S. Cl.
CPC ........ *G05D 23/1917* (2013.01); *F24F 11/006* (2013.01); *F24F 2011/0061* (2013.01);
(Continued)

(58) Field of Classification Search
CPC G05B 15/02; G05B 13/04; G05B 2219/2614; G05B 13/0265; F24F 11/0012;
(Continued)

(56) References Cited

U.S. PATENT DOCUMENTS 7,216,021 B2    5/2007  Matsubara et al.
7,467,018 B1 *  12/2008  Callaghan .......... G05B 19/4186
                                          700/1
(Continued)

FOREIGN PATENT DOCUMENTS

CN    101021914 A    8/2007
CN    101027615 A    8/2007
(Continued)

OTHER PUBLICATIONS

Oldewurtel et al. (Use of model predictive control and weather forecasts for energy efficient climate control, Energy and Buildings 45 (2012) 15-27)) in view over Wen et al. (Building Temperature Control: A Passivity-Based Approach, Dec. 10, 2012).*
(Continued)

*Primary Examiner* — Darrin Dunn
(74) *Attorney, Agent, or Firm* — Rabin & Berdo, P.C.

(57) ABSTRACT

The present disclosure discloses a controlling device and method for a Heating Ventilation and Air Conditioning system. The controlling device includes a building heat load module, a data collecting module, an optimization module, and a controller. A building heat load model is established according to building envelope data. Field information data and setup data are collected. The building heat load model, the field information data, and the setup data are integrated to produce optimal setup data by optimal computation. According to the optimal setup data, the HVAC system proceeds to modulate room temperature, room humidity, or gas concentration to achieve functions of maintaining indoor thermal comfort and energy conservation.

18 Claims, 6 Drawing Sheets

(52) U.S. Cl.
CPC ............... *F24F 2011/0063* (2013.01); *F24F 2011/0075* (2013.01)

(58) Field of Classification Search
CPC ............... F24F 11/006; F24F 11/0086; F24F 2011/0068; F24F 2011/0091; F24F 2011/0075; F24F 2011/0061; F24F 2011/0071; F24F 11/0009; F24F 2011/0094; F24F 2011/0036; F24F 2011/0058; F24F 11/00; F24F 11/0076; F24F 2011/0057; F24F 11/02; F24F 2011/0035; F24F 2221/32; F24F 11/0015; F24F 2011/0049; F24F 2011/0046; F24F 2011/00

See application file for complete search history.

(56) References Cited

U.S. PATENT DOCUMENTS

| | | | |
|---|---|---|---|
| 7,502,768 B2 | 3/2009 | Ahmed et al. | |
| 7,770,806 B2 | 8/2010 | Herzon et al. | |
| 8,255,085 B2 | 8/2012 | Salsbury | |
| 8,280,536 B1 | 10/2012 | Fadell et al. | |
| 2002/0023188 A1* | 2/2002 | Heidel | G05B 19/418 710/305 |
| 2008/0120069 A1* | 5/2008 | Martin | G06F 17/5004 703/1 |
| 2009/0107212 A1* | 4/2009 | Becker | G05B 19/0423 73/23.2 |
| 2010/0262298 A1* | 10/2010 | Johnson | F24F 11/001 700/277 |
| 2012/0010758 A1* | 1/2012 | Francino | G05B 17/02 700/291 |
| 2012/0065783 A1* | 3/2012 | Fadell | F24F 11/006 700/276 |
| 2012/0091213 A1 | 4/2012 | Altonen et al. | |
| 2012/0131217 A1 | 5/2012 | Delorme et al. | |
| 2013/0060391 A1* | 3/2013 | Deshpande | F24F 11/0009 700/291 |
| 2013/0151013 A1* | 6/2013 | Nikovski | F24F 11/006 700/276 |
| 2013/0238144 A1* | 9/2013 | Shahapurkar | F24F 11/0009 700/278 |
| 2013/0260668 A1* | 10/2013 | Stakutis | F24F 11/0001 454/256 |
| 2013/0289967 A1* | 10/2013 | Ludwig | G06Q 10/06 703/13 |
| 2014/0047064 A1* | 2/2014 | Maturana | H04L 67/125 709/217 |
| 2014/0067132 A1* | 3/2014 | Macek | F24F 11/006 700/276 |
| 2014/0245762 A1* | 9/2014 | Schlesinger | F25B 49/02 62/89 |
| 2014/0365017 A1* | 12/2014 | Hanna | F24F 11/001 700/276 |
| 2015/0006129 A1* | 1/2015 | An | G06F 17/5009 703/2 |
| 2015/0134124 A1* | 5/2015 | Carter | G05D 23/1923 700/278 |
| 2015/0167996 A1* | 6/2015 | Fadell | F24F 11/006 700/276 |
| 2016/0054018 A1* | 2/2016 | Motodani | F24F 11/001 700/276 |
| 2016/0098022 A1* | 4/2016 | Wenzel | G05B 13/0265 700/275 |
| 2016/0187911 A1* | 6/2016 | Carty | G05B 15/02 700/276 |

FOREIGN PATENT DOCUMENTS

| | | |
|---|---|---|
| CN | 101493690 A | 7/2009 |
| JP | 2011214794 A | 10/2011 |
| TW | 367400 | 8/1999 |
| TW | 200736557 A | 10/2007 |
| TW | M397498 U | 2/2011 |
| TW | I358516 B | 2/2012 |

OTHER PUBLICATIONS

Wen et al. (Building Temperature Control: A Passivity-Based Approach, Dec. 10, 2012).*
Taiwan Patent Office, Office Action, Patent Application No. TW102145813, dated Dec. 29, 2015, Taiwan.
Privara et al., Builiding modeling as a crucial part for building predictive control; Energy and Buildings; Jan. 2013; 15; pp. 8-22.
Ginestet et al., Control tuning of a simplified VAV system: Metholodology and impact on energy consumption and IAQ; "Energy and Building"; Aug. 2010; 10; pp. 1205-1214.
Bacher et al., Identifying suitable models for the heat dynamics of buildings; Energy and Buildings; Jul. 2011; 12; pp. 1511-1522.
Hazyuk et al., Optimal temperature control of intermittently heated buildings using Model Predictive Control: Part I—Building modeling; Building and Environment; May 2012; 9; pp. 379-387.
Hazyuk et al., Optimal temperature control of intermittently heated buildings using Model Predictive Control: Part II—Control algorithm; "Building and Environment"; May 2012; 7; pp. 388-394.
China Patent Office, Office Action dated Jan. 22, 2017.
Oldewurtel et al., Use of model predictive control and weather forecasts for energy efficient building climate control, Energy and Buildings, vol. 45, Feb. 29, 2012, pp. 15-27.
Freire et al., Predictive controllers for thermal comfort optimization, Energy and Buildings, vol. 40, 2008, issue 7, pp. 1353-1365.

* cited by examiner

CONTROLLING DEVICE AND METHOD FOR HVAC SYSTEM

CROSS-REFERENCE TO RELATED APPLICATIONS

This application claims priority to Taiwanese Application Serial No. 102145813, filed on Dec. 12, 2013. The entirety of the above-mentioned patent application is hereby incorporated by reference herein and made a part of this specification.

BACKGROUND

1. Technical Field

The present disclosure relates to controlling devices and methods, and, in particular, to a controlling device and method for an HVAC system.

2. Description of Related Art

The air conditioning system is used for controlling and maintaining temperature, humidity, pressure, wind, and cleanness inside a building in a predetermined range to make personnel live comfortably inside an environment of the building. A heating, ventilation and air conditioning (HVAC) system is one of the air conditioning systems as know by person having ordinary skills in the art.

However, as traditional controlling method of air conditioning systems is predetermined in fixed values, therefore, it can not be applied to suit the measure to local conditions in different situations. If the predetermined fixed values are not appropriately set up, not only the environment thermal comfort inside a building is reduced, but also power consumption of an air conditioning system is increased without considering environment factors in many ways.

Meanwhile, as environmental protection issues raise, everyone is dedicated to energy conservation and carbon reduction. In ordinary daily life, an air conditioning system takes a great majority ratio of power consumption, and it would make a major progress, if the air conditioning system proceeds energy-saving.

Therefore, it would be problems to be solved that are how to take indoor environment factors such as temperature, humidity into consideration, and to maintain environment thermal comfort for indoor personnel and reduce power consumption in the same time.

SUMMARY

The present disclosure discloses a controlling device used for controlling an HVAC system that modulates an indoor environment of a building. The controlling device comprises a building heat load module configured for establishing a building heat load model according to building envelope data; a data collecting module that collects field information data and setup data; an optimization module that integrates the building heat load model, the field information data, and the setup data to produce optimal setup data by optimal computation; and a controller that controls the HVAC system to modulate the indoor environment of the building.

The present disclosure discloses a controlling method for an HVAC system used that modulates an indoor environment of a building. The controlling method comprises collecting building envelope data to establish a building heat load model, and collecting field information data and setup data; integrating the building heat load model, the field information data, and the setup data to produce optimal setup data by optimal computation; and controlling the HVAC system to modulate the indoor environment of the building according to the optimal setup data.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Figure 1:
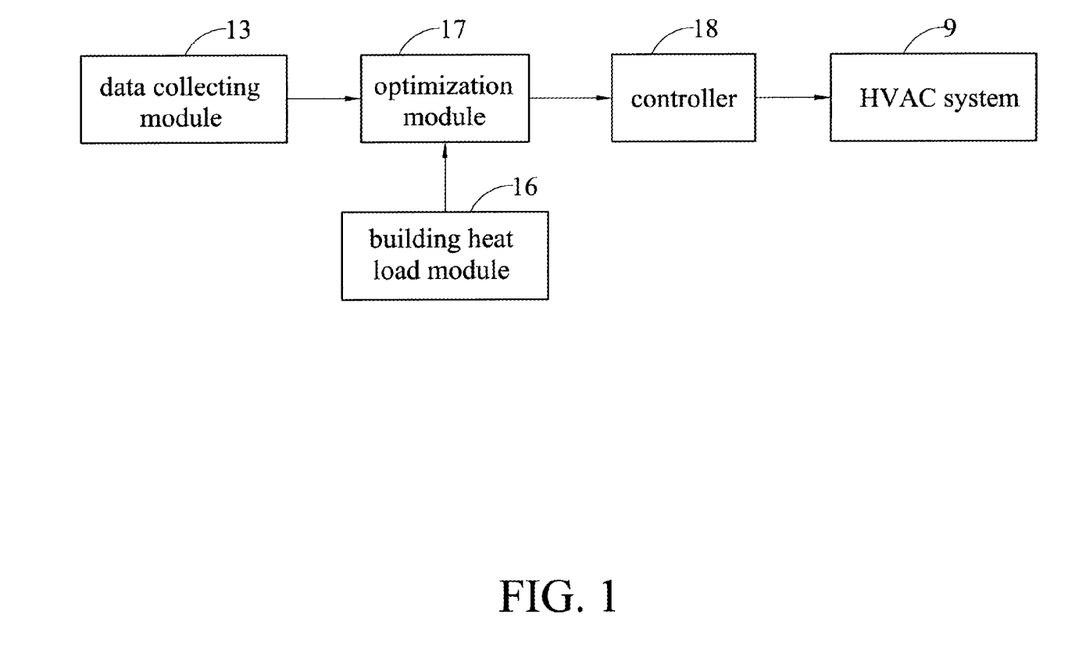
FIG. 1 illustrates an architecture of a controlling device according to the present disclosure for an HVAC system.

FIG. 1 illustrates an architecture of a controlling device according to the present disclosure for an HVAC system. The controlling device for an HVAC system 9 comprises a data collecting module 13, a building heat load module 16, an optimization module 17, and a controller 18.

The data collecting module 13 is used for collecting field information data and setup data. The field information data is (are), for example, hazard gas concentration (such as CO, $CO_2$), and/or room temperature, and/or room humidity, and/or power consumption of the HVAC system 9. The setup data is, for example, a predetermined indoor temperature which is a predetermined value of a remote controller for operating an air conditioner or a fan.

The building heat load module 16 is used for collecting building envelope data in order to establish a building heat load model. The building envelope data are, for example, properties of building material which are used for forming an indoor space, and area value of the building material. Besides, the building envelope data are stored in a database (not shown).

The optimization module 17 integrates the building heat load model, the field information data, and the setup data to produce optimal setup data by optimal computation automatically or manually. For example, a control algorithm based on Linear Quadratic Regulator (LQR) or Linear Quadratic Gaussian (LQG) is used to proceed the optimizing computing. The control algorithm might be H2, H∞, or hybrid type H2/H∞.

Given a stable and proper transfer function $G(j\omega)$, its H2 norm is as follows $$\|G\|_2 = \left\{\frac{1}{2\pi}\mathrm{trace}\left[\int_{-\infty}^{+\infty} G(j\omega)G(-j\omega)^T \, d\omega\right]\right\}^{1/2}.$$

It mainly guarantees the energy minimization of systems.

Given a stable and proper transfer function G(jω), its H∞ norm as follows $$\|G\|_\infty = \sup_{0\leq\omega\leq\infty} \sigma_{max}[G(j\omega)].$$

It mainly guarantees the stability of systems.

According to the optimal setup data, the controller 18 controls the HVAC system 9 to modulate the indoor environment of the building for achieving functions of saving power consumption of the HVAC system 9, and of maintaining indoor thermal comfort.

Besides, the controlling device according to the present disclosure which is used for an HVAC system 9 further comprises a communication module. The building heat load module 16 may be located in a remote area, and transmits data to the optimization module 17 through the communication module. In an embodiment, the building heat load module 16 and the optimization module 17 are located in a remote area, and transmit data to the controller 18 and the data collecting module 13 through the communication module.

Figure 2A:
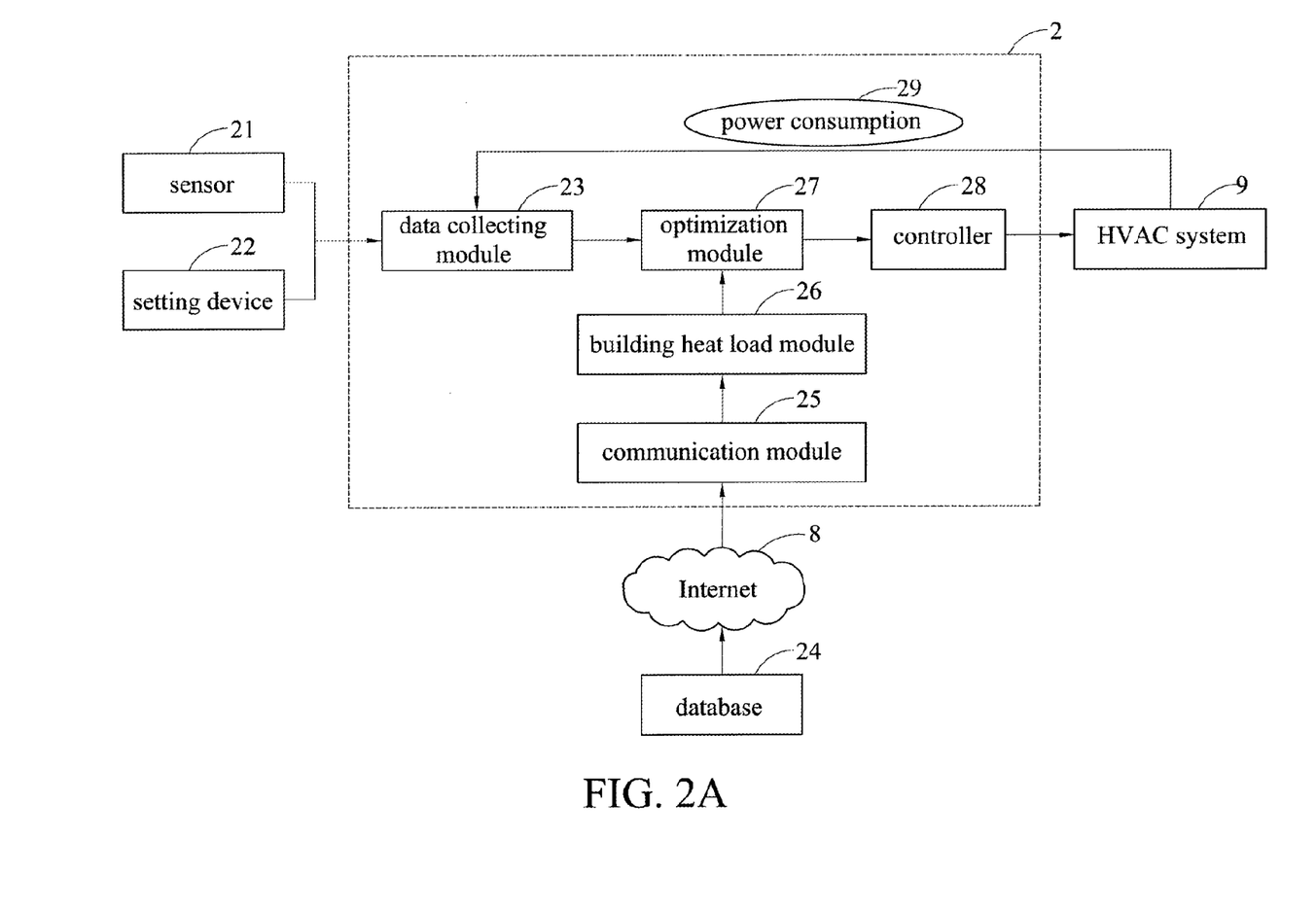
FIG. 2A illustrates a controlling device for an HVAC system in accordance with a first embodiment of the present disclosure.

FIG. 2A illustrates a controlling device for an HVAC system 9 in accordance with a first embodiment of the present disclosure. The controlling device comprises a sensor 21, a setting device 22, a data collecting module 23, a database 24, a communication module 25, a building heat load module 26, an optimization module 27, and a controller 28.

The data collecting module 13 is used for collecting field information data obtained by the sensor 21 which senses indoor environment of a building. The setting device 22 sets predetermined data of the indoor environment of the building, and power consumption 29 of the HVAC system 9. The field information data may be gases concentration, for example, $CO_2$ concentration, and/or room temperature, and/or room humidity, and the predetermined data is the predetermined indoor temperature.

The database 24 is used for storing building envelope data, for example, building materials used in indoor space, such as walls, ceilings, floors, window and door material properties, and areas of building materials, wherein building materials properties are total thermal conductivity coefficient and thermal resistance.

The communication module 25 receives the building envelope data stored in the database 24 through the Internet 8, and transmits them to the building heat load module 26.

The building heat load module 26 collects building envelope data to establish a building heat load model, wherein the calculation for establishing the building heat load model is $$\frac{d}{dt}T_{in} = -\frac{UA}{mc}T_{in} + \frac{1}{mc}Q_{in} + \frac{UA}{mc}T_{out},$$

where A is the area of the building material, U is a heat transfer coefficient of the building material, $T_{in}$ is the indoor temperature, $T_{out}$ is the outdoor temperature, Q is the heat, m is the mass, c is the specific heat, wherein the calculation of the U value is $$U = \frac{1}{\Sigma R},$$

and R is the thermal resistance of the building material according to Approved Document L Part 1A (2006 edition) sets the following 'reasonable limits'. Approved Document L Part 1A (2006 edition) relates to the conservation of fuel and power in dwellings, and pages 18 and 19 of this document describe the calculation of 'U-values.'

The optimization module 27 integrates the building heat load model, the field information data, and the setup data to produce optimal setup data by optimal computation automatically or manually. A control algorithm based on LQR or LQG is used to proceed the optimizing computing. The control algorithm may be, for example, H2, H∞, or hybrid type H2/H∞.

According to the optimal setup data obtained by the optimization module 27, the controller 28 controls the HVAC system 9 to modulate indoor temperature, and/or indoor humidity, and/or air flow of the HVAC system 9 to maintain thermal comfort of indoor environment. And as described in the above, the data collecting module 23 takes the power consumption 9 of the HVAC system 9 into consideration as a considered factor of the optimization module 27 to achieve an effect of controlling power consumption.

Besides, the controlling device for an HVAC system 9 can locate the database 24 in a cloud base, and the database 24 transmits data through the Internet 8 to a control equipment, which integrates the data collecting module 23, the communication module 25, the building heat load module 26, the optimization module 27, and the controller 28.

Figure 2B:
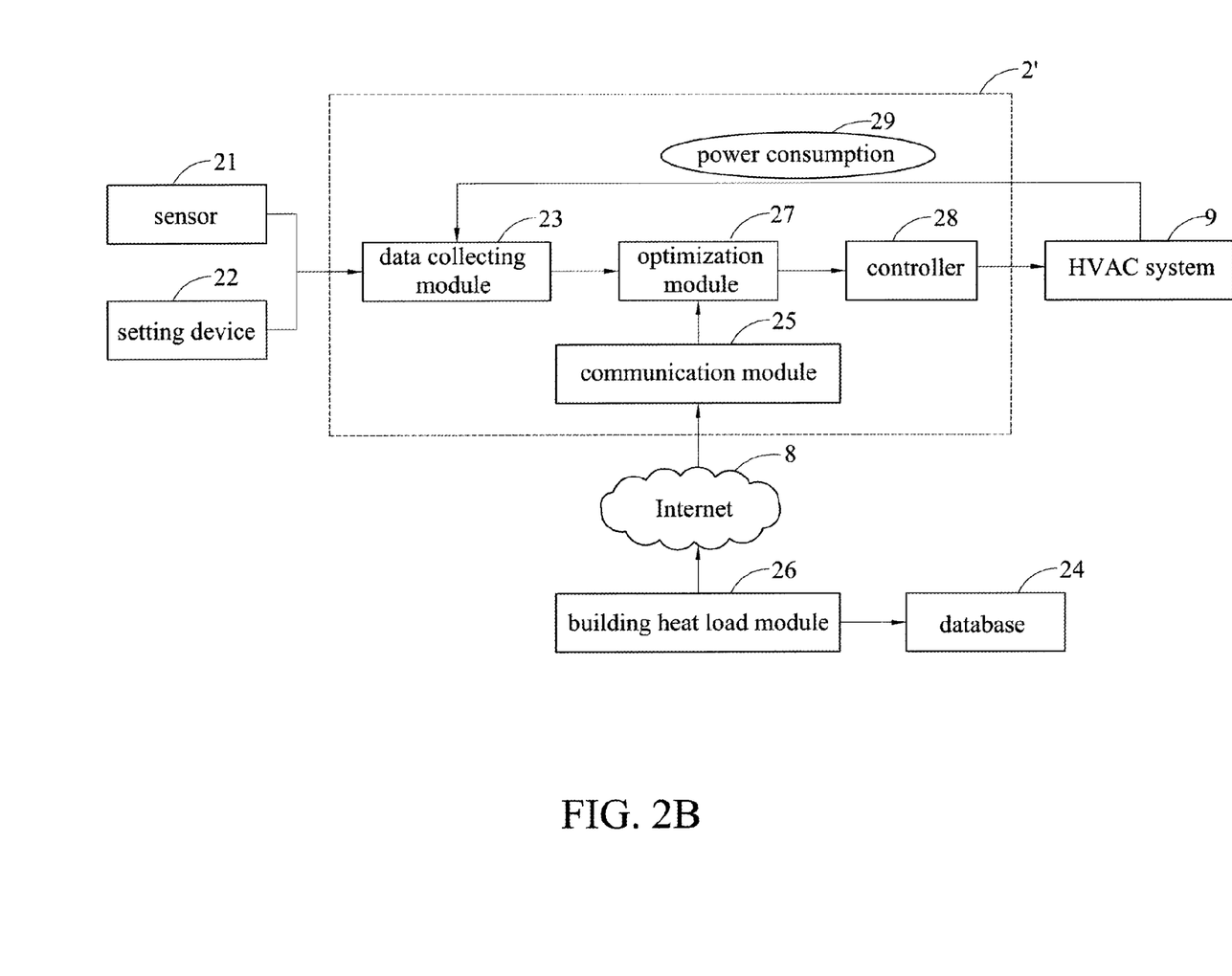
FIG. 2B illustrates a controlling device for an HVAC system in accordance with a second embodiment of the present disclosure.

FIG. 2B illustrates a controlling device for an HVAC system 9 in accordance with a second embodiment of the present disclosure. The building heat load module 26 and the database 24 are simultaneously located in the cloud environment, and transmit data through the Internet 8 to a control equipment 2', which integrates the data collecting module 23, the communication module 25, the optimization module 27, and a controller 28.

Figure 2C:
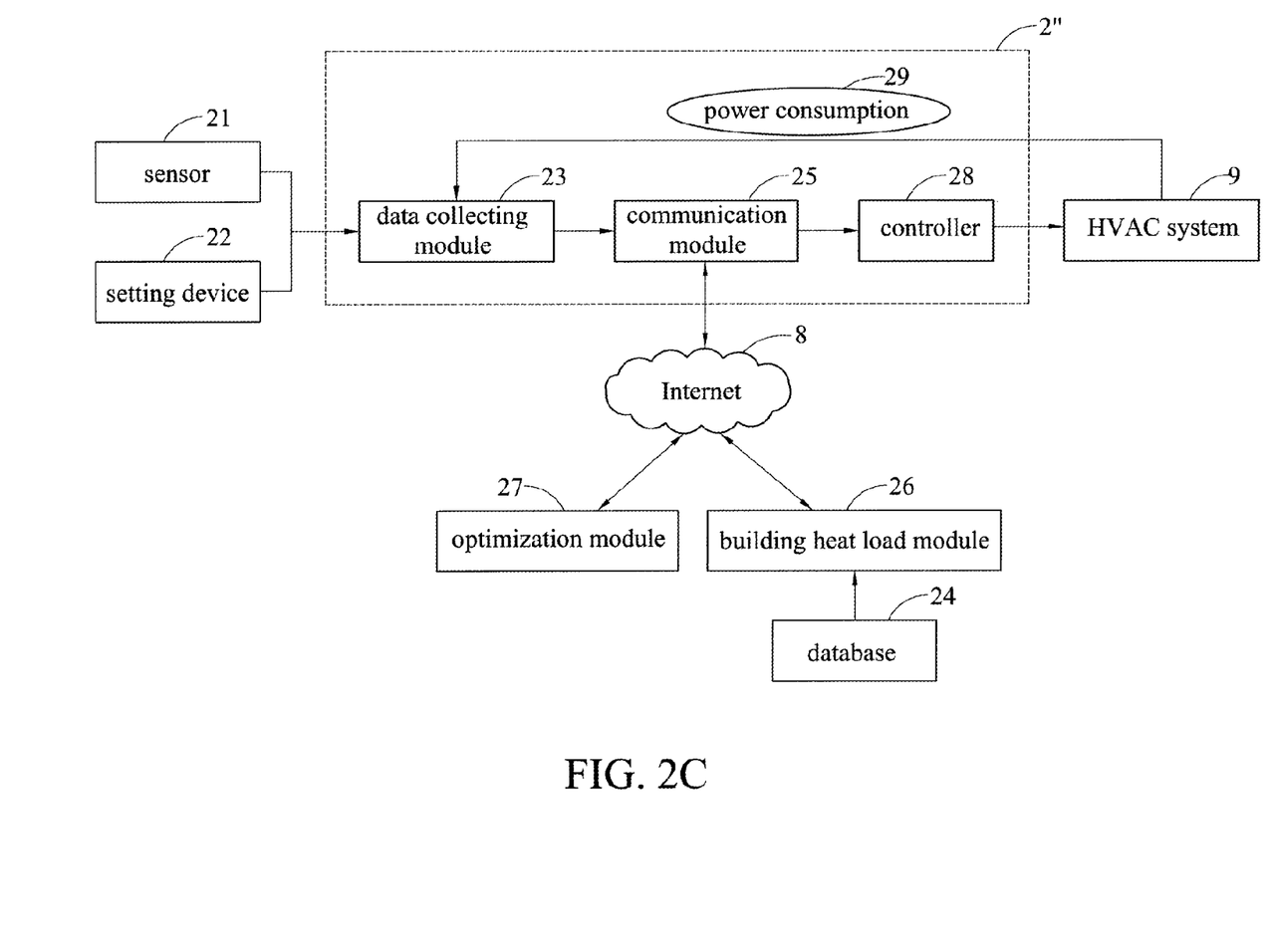
FIG. 2C illustrates a controlling device for an HVAC system in accordance with a third embodiment of the present disclosure.

FIG. 2C illustrates a controlling device for an HVAC system 9 in accordance with a third embodiment of the present disclosure. The building heat load module 26, the optimization module 27, and the database 24 are located in the cloud environment, and transmit data through the Internet 8 to a control equipment 2", which integrates the data collecting module 23, the communication module 25, and the controller 28.

Based on three different embodiment types as shown in FIGS. 2A, 2B, and 2C, the user can apply different equipments according to different indoor space factors and his/her demand, and, furthermore, the different equipments can be modified as to fit different commercial types to promote effect of economic benefits.

Figure 3:
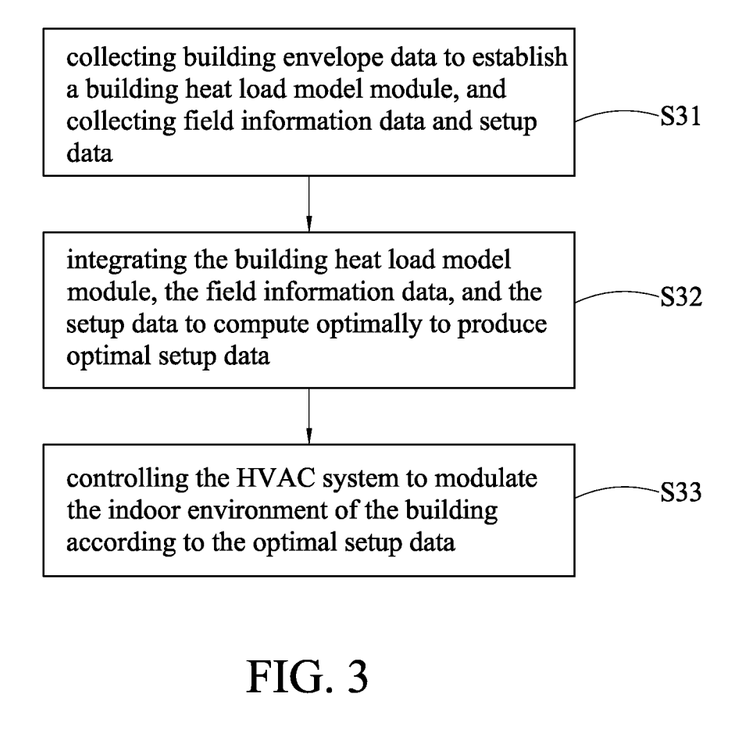
FIG. 3 illustrates a flow chart of a controlling method for an HVAC system according to the present disclosure.

FIG. 3 illustrates a flow chart of a controlling method for an HVAC system according to the present disclosure. Firstly, in step S31, the building envelope data are collected to establish the building heat load model, and the field information data and setup data are collected.

Secondly, in step S32, the building heat load model, the field information data, and the setup data are integrated to produce optimal setup data by optimal computation automatically or manually.

Finally, in step S33, the HVAC system is controlled for modulating the indoor environment of the building according to the optimal setup data.

Figure 4:
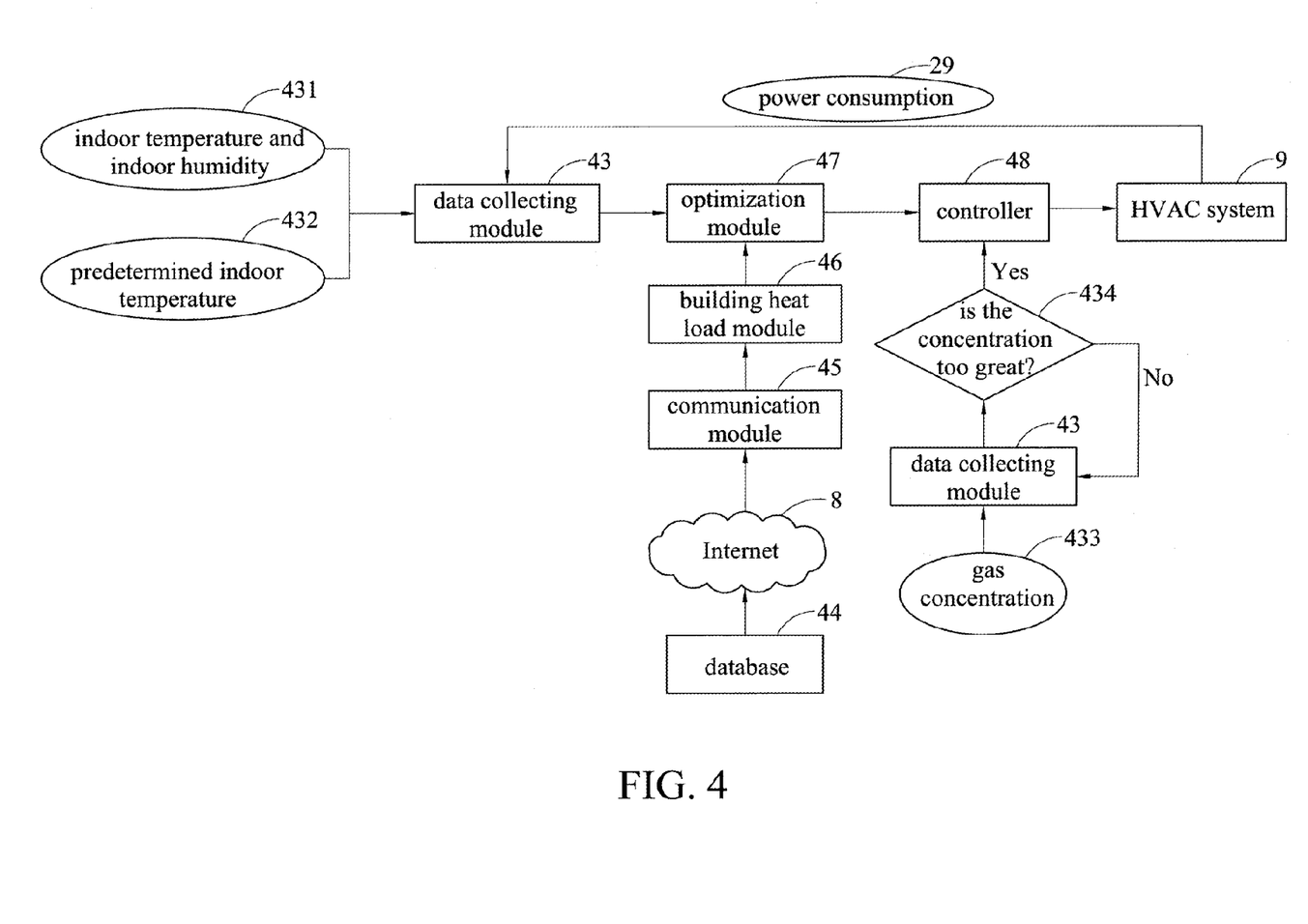
FIG. 4 illustrates a controlling device and a method for an HVAC system in accordance with an embodiment of the present disclosure.

FIG. 4 illustrates a controlling device and a method for an HVAC system in accordance with an embodiment of the present disclosure. The database 24 stores building envelope data such as indoor building materials and materials properties. The building heat load module 46 collects the building envelope data through the Internet 8 to establish a building heat load model, wherein the calculation for establishing building heat load model is $$\frac{d}{dt}T_{in} = -\frac{UA}{mc}T_{in} + \frac{1}{mc}Q_{in} + \frac{UA}{mc}T_{out}.$$

Besides, a plurality of data collecting modules 43 are located in an indoor space for collecting field information data such as indoor temperature and indoor humidity 431, and collecting predetermined data such as a predetermined indoor temperature, gas concentration (for example, $CO_2$ concentration) 433, and power consumption 29 of the HVAC system 9. If the gas concentration is detected and over a predetermined value through a determining procedure 434, the plurality of data collecting modules 43 transmit to the controller 48 information indicating that the gas concentration is high, in order to modulate the indoor gas concentration to the predetermined value. If the gas concentration is detected to be below a predetermined value through the determining procedure 434, the plurality of data collecting modules 43 continue collecting data of the gas concentration.

Besides, the optimization model 47 integrates the building heat load model, the field information data, and the setup data to produce optimal setup data by optimal computation automatically or manually by using a control algorithm, for example, H2, or H∞, based on LQR or LQG, and to transmit the optimal setup data to the controller 48.

According to the optimal setup data, the controller 48 controls the HVAC system 9 to modulate indoor temperature, and/or indoor humidity, and/or air flow output of the HVAC system 9 to maintain thermal comfort of indoor environment and to control the power consumption of the HVAC system 9.

As described in the above expression, the present disclosure discloses a controlling device and method for an HVAC system. Under a prerequisite, without sacrificing the thermal comfort of indoor environment for the human body, an operation of the HVAC system is controlled to effectively achieve functions of controlling the power consumption and maintaining environment thermal comfort.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claim is:

1. A controlling device used for a heating, ventilation and air conditioning (HVAC) system that modulates an indoor environment of a building, the controlling device comprising:
   a building heat load module configured for establishing a building heat load model according to building envelope data, wherein the building envelope data are properties of building material used for forming an indoor space, and an area value of the building material, and a calculation for establishing the building heat load model is $$\frac{d}{dt}T_{in} = -\frac{UA}{mc}T_{in} + \frac{1}{mc}Q_{in} + \frac{UA}{mc}T_{out},$$

wherein a calculation of the U value is $$U = \frac{1}{\sum R},$$

U is a heat transfer coefficient of the building material, A is an area of the building material, Q is heat, m is the mass, c is the specific heat, and R is a thermal resistance of the building material;
   a data collecting module configured for collecting field information data and setup data, wherein the field information data includes power consumption of the HVAC system;
   an optimization module configured for integrating the building heat load model, the field information data, and the setup data to produce optimal setup data by optimal computation; and
   a controller that controls the HVAC system according to the optimal setup data to modulate the indoor environment of the building according to the optimal setup data.

2. The controlling device of claim 1, further comprising a database that stores the building envelope data.

3. The controlling device of claim 1, further comprising:
   a sensor that senses the indoor environment to produce the field information data; and
   a setting device that sets the indoor environment to produce the setup data.

4. The controlling device of claim 1, further comprising a communication module, for the building heat load module which is located in a remote area, to transmit data to the optimization module through the communication module.

5. The controlling device of claim 1, further comprising a communication module, for the building heat load module and the optimization module which are located in a remote area, to transmit data to the controller and the data collecting module through the communication module.

6. The controlling device of claim 1, wherein the field information data further includes gas concentration, room temperature, or room humidity, and the setup data is a predetermined indoor temperature.

7. The controlling device of claim 6, wherein as the gas concentration exceeds a predetermined value, the data collecting module transmits to the controller an information indicating that the gas concentration is high, and the controller controls the HVAC system to modulate indoor gas concentration to a predetermined value, and the data collecting module continues collecting data of the gas concentration when the gas concentration is below the predetermined value.

8. The controlling device of claim 6, wherein the optimization model produces the optimal setup data by an optimal computation and transmits the optimal setup data to the controller, and the controller controls, based on the optimal setup data, the HVAC system to modulate the indoor temperature, the indoor humidity, and air flow output of the HVAC system to maintain thermal comfort of the indoor environment and to control power consumption of the HVAC system.

9. The controlling device of claim 1, wherein the optimization module uses a control algorithm based on Linear Quadratic Regulator or Linear Quadratic Gaussian to proceed the optimizing computing.

10. The controlling device of claim 9, wherein the control algorithm is H2, H∞, or hybrid type H2/H∞.

11. The controlling device of claim 2, further comprising a communication module that receives the building envelope data stored in the database and transmits the building envelope data to the building heat load module.

12. The controlling device of claim 11, wherein the database is located in a cloud base, and transmits data through the Internet to a control equipment that integrates the data collecting module, the communication module, the building heat load module, the optimization module, and the controller.

13. The controlling device of claim 11, wherein the building heat load module and the database are located in a cloud base and transmit data through the Internet to a control equipment that integrates the data collecting module, the communication module, the optimization module, and the controller.

14. The controlling device of claim 11, wherein the building heat load module, the optimization module, and the database are located in a cloud base, and transmit data through the Internet to a control equipment that integrates the data collecting module, the communication module, and the controller.

15. A controlling method used for an HVAC system that modulates an indoor environment of a building, the method comprising:

collecting building envelope data to establish a building heat load model, and collect field information data and setup data, wherein the building envelope data are properties of building material used for forming an indoor space, and an area value of the building material, and a calculation for establishing the building heat load model is $$\frac{d}{dt}T_{in} = -\frac{UA}{mc}T_{in} + \frac{1}{mc}Q_{in} + \frac{UA}{mc}T_{out},$$

wherein a calculation of the U value is $$U = \frac{1}{\sum R},$$

U is a heat transfer coefficient of the building material, A is an area of the building material, Q is heat, m is the mass, c is the specific heat, and R is a thermal resistance of the building material;

integrating the building heat load model, the field information data, and the setup data to produce optimal setup data by optimal computation, wherein the field information data includes power consumption of the HVAC system; and controlling the HVAC system according to the optimal setup data to modulate an indoor environment of the building according to the optimal setup data.

16. The controlling method of claim 15, wherein the field information data further includes gas concentration, room temperature, or room humidity, and the setup data is a predetermined indoor temperature.

17. The controlling method of claim 15, wherein the optimal setup data is obtained by using a control algorithm based on Linear Quadratic Regulator or Linear Quadratic Gaussian to proceed the optimizing computing.

18. The controlling method of claim 17, wherein the control algorithm is H2, H∞, or hybrid type H2/H∞.

* * * * *